United States Patent [19]

Tanaka et al.

[11] Patent Number: 4,819,786

[45] Date of Patent: Apr. 11, 1989

[54] WORK INDEXING APPARATUS WITH A HEIGHT ADJUSTMENT FOR A PAIR OF TRANSFER BARS

[75] Inventors: Toshihiro Tanaka; Hiateru Yamashita, both of Komatsu, Japan

[73] Assignee: Kabushiki Kaisha Komatsu Seisakusho, Tokyo, Japan

[21] Appl. No.: 421,333

[22] Filed: Sep. 22, 1982

[51] Int. Cl.[4] .............................................. B65G 25/04
[52] U.S. Cl. .................................................... 198/621
[58] Field of Search ......................... 198/621; 414/751

[56] References Cited

U.S. PATENT DOCUMENTS 3,456,814  7/1969  Bautz ............................. 414/751 X
3,655,070  4/1972  Haydu ............................ 198/621 X

FOREIGN PATENT DOCUMENTS 108074  8/1979  Japan .................................... 198/621

Primary Examiner—Robert J. Spar
Assistant Examiner—Lyle K. Kimms

Attorney, Agent, or Firm—Armstrong, Nikaido, Marmelstein & Kubovcik

[57] ABSTRACT

Apparatus including a pair of transfer bars, extending horizontally in spaced parallelism, for transporting work through successive processing stations as in a three-dimensional transfer press system for the fabrication of various panel products. The transfer bars are cam operated to move back and forth, up and down, and toward and away from each other, thereby three-dimensionally transferring work. For the up-and-down motion of the transfer bars a lift cam mechanism is coupled via a rack-and-pinion linkage to lift carriers carrying the transfer bars so as to allow them to reciprocate longitudinally and move toward and away from each other. Interposed between the lift cam mechanism and the rack-and-pinion linkage is a height adjustment mechanism providing a variable length of connection therebetween to make it possible to adjust the lowermost position of the transfer bars to the height of the lower press dies in use.

3 Claims, 3 Drawing Sheets

WORK INDEXING APPARATUS WITH A HEIGHT ADJUSTMENT FOR A PAIR OF TRANSFER BARS

BACKGROUND OF THE INVENTION

Our invention relates to apparatus for indexing or transporting work to be operated upon in various ways, and more specifically to apparatus having a pair of transfer bars for indexing work through a series of processing stations as, for example, in a three-dimensional transfer press system for the fabrication of various panel products such as those used for roofing, flooring, and doors. Still more specifically, our invention concerns such work indexing apparatus having facilities for ready adjustment of the vertical positions of the transfer bars.

As is well known, in a three-dimensional transfer press system, the pair of transfer bars in question extend horizontally and in parallel spaced relation to each other throughout the press system. In operation they are reciprocated longitudinally and further moved up and down and toward and away from each other for three-dimensionally transferring successive panels from one press station to the next. Hence the name "three-dimensional transfer" press system.

As heretofore constructed, the three-dimensional work indexing apparatus has allowed the up-and-down motion of the transfer bars between fixed limits only. This has required the lower press dies to be sized to the fixed lowermost position of the transfer bars. Obviously, then, the press system with the three-dimensional work indexing apparatus will gain still greater versatility if the limits of the vertical travel of the transfer bars are made adjustable to admit of the use of lower dies of various heights.

SUMMARY OF THE INVENTION

Our invention seeks to make it possible to adjustably vary the upper and lower extremities between which the pair of transfer bars are moved up and down in work indexing apparatus of the type under consideration. In attaining this objective, moreover, the invention seeks to make utmost use of the parts existing in the work indexing apparatus and to make the operation of the height adjustment mechanism positive, reliable, and easy to control.

Briefly, in the work indexing apparatus of our invention, lift carrier means carry a pair of transfer bars for joint up-and-down motion therewith while allowing them to reciprocate longitudinally and to move toward and away from each other. For the up-and-down motion of the transfer bars a lift cam mechanism comprising a disc cam and a lift lever oscillated thereby is coupled to the lift carrier means via a rack-and-pinion linkage. Interposed between the lift lever of the lift cam mechanism and the rack-and-pinion linkage is a height adjustment mechanism to provide a variable length of connection therebetween.

In a preferred embodiment the height adjustment mechanism comprises a multiple abutment member pivotally and rotatably connected to the lift lever. Generally in the shape of a hollow cylinder, the multiple abutment member is recessed to provide several diametrically opposed pairs of abutments located at different distances from the lift lever and in different angular positions about the axis of rotation of the multiple abutment member. A link rigidly coupled at one end to the rack-and-pinion linkage slidably extends through the multiple abutment member and has a pair of hooks on the other end for engagement with any selected one of the abutment pairs depending upon the angular position of the multiple abutment member relative to the link. Thus the length of connection offered by the height adjustment mechanism between lift lever and rack-and-pinion linkage is variable merely by revolving the multiple abutment member. A change in this length of connection results, of course, in a corresponding change in the upper and lower limits between which the transfer bars are moved by the lift cam mechanism.

The above and other objects, features and advantages of our invention and the manner of attaining them will become more apparent, and the invention itself will best be understood, from a study of the following description taken in connection with the attached drawings.

DESCRIPTION OF THE PREFERRED EMBODIMENT

Figure 1:
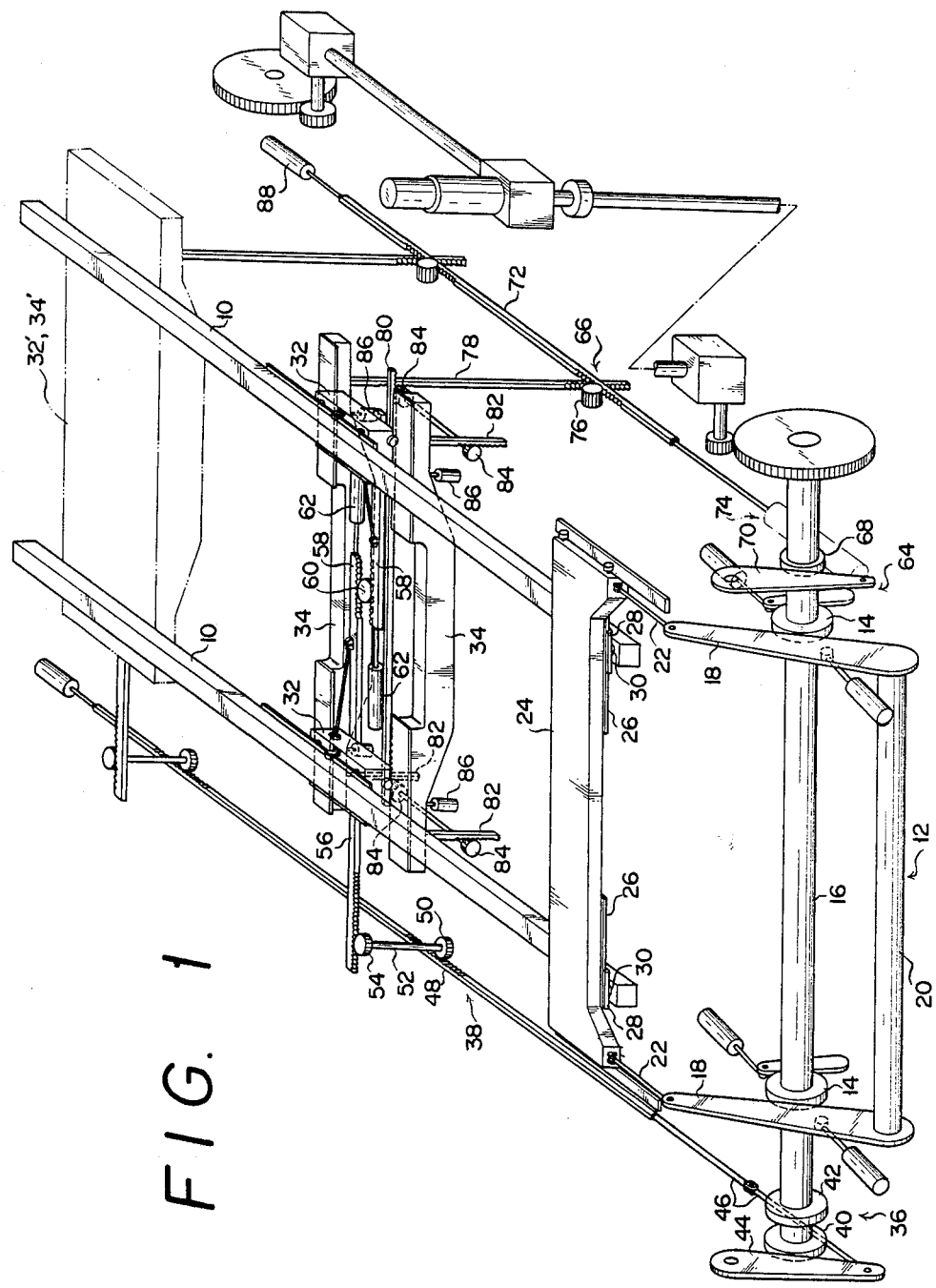
FIG. 1 shows in perspective the work indexing apparatus of our invention as adapted for use in a three-dimensional transfer press system.

We will now describe in detail a preferred form of the work indexing apparatus incorporating the novel concepts of our invention. With reference first to FIG. 1 it will be noted from this figure that the apparatus has a pair of transfer bars 10 extending horizontally in spaced parallelism. For imparting longitudinal reciprocation to the transfer bars a feed mechanism 12 is provided adjacent one of the opposite extremities of the transfer bar pair, although in practice another similar feed mechanism may be provided adjacent the other extremity thereof.

The illustrated feed mechanism 12 comprises a pair of identical disc cams 14 nonrotatably mounted on a camshaft 16 arranged at right angles with the transfer bars 10. In abutting contact with the respective disc cams are a pair of feed levers 18 mounted at their lower ends on a common pivot 20. The upper, free ends of the feed levers 18 are coupled via respective links 22 to a feed carrier 24 carrying the transfer bars 10 for joint reciprocation therewith. Each link 22 is pin jointed at both ends to one of the feed levers 18 and to the feed carrier 24. The feed carrier carries on its underside a pair of guide rails 26 extending transversely of the transfer bars 10. A pair of shoes 28 rigidly pinned at 30 to the respective transfer bars slidably engage the respective guide rails 26.

Thus, with the rotation of the camshaft 16, the pair of feed levers 18 oscillate in synchronism and so conjointly reciprocate the transfer bars 10 longitudinally via the links 22 and the feed carrier 24. It will be seen that the feed carrier is constrained to joint reciprocation with the transfer bars in the longitudinal direction of the latter but nevertheless allows them to move up and down and toward and away from each other.

The pair of transfer bars 10 are further supported by one or more, two in the illustrated embodiment, pairs of grip carriers 32 and by the same number of pairs of lift carriers 34. FIG. 1 shows in detail only one pair of grip carriers and one associated pair of lift carriers, the other pairs of grip carriers and lift carriers being depicted by the phantom outline referenced 32', 34'. We will describe only the illustrated pair of grip 32 and lift 34 carriers, as well as means associated therewith, with the understanding that the same description applies to the other pairs of grip 32' and lift 34' carriers.

Immediately underlying the respective transfer bars 10 are the pair of grip carriers 32 which are coupled to the transfer bars for joint sideways motion therewith but which allows them to travel longitudinally. The grip carriers are both mounted on the pair of lift carriers 34, extending transversely of the transfer bars, for rolling motion toward and away from each other together with the transfer bars thereon. For the desired movement of the grip carriers 32 toward and away from each other the left hand one, as seen in FIG. 1, of these is coupled to a grip cam mechanism 36 via a rack-and-pinion linkage 38.

The grip cam mechanism 36 comprises two disc cams 40 and 42 of different contours mounted on the camshaft 16 for joint rotation therewith but for axial sliding motion thereon, and a grip lever 44 capable of selective engagement with the two disc cams. The disc cam 40 is intended for use in three-dimensionally transferring work, that is, in transporting work by moving the pair of transfer bars back and forth, up and down, and toward and away from each other. The other disc cam 42 is intended for use in two-dimensional work transfer, with the transfer bars moved only back and forth and toward and away from each other. Means for moving the transfer bars up and down during three-dimensional work transfer, and means for preventing the transfer bars from moving up and down during two-dimensional work transfer, will both appear as the description proceeds.

Oscillated by either of the disc cams 40 and 42, the grip lever 44 has its free end coupled via articulated links 46 to a rack 48 forming a part of the rack-and-pinion linkage 38. The rack 48 meshes with a pinion 50 on one end of an upstanding shaft 52. Mounted on the other end of this shaft is another pinion 54 in mesh with a rack 56, which is rigidly anchored to one of the grip carriers 32. A pair of racks 58 extend one from each grip carrier 32 toward the other and both mesh with a pinion 60. A pair of air cylinders 62 have their piston rods coupled to the respective racks 58 for yieldably urging the grip carriers 32 toward each other. Thus, with the rotation of the camshaft 16, the grip carriers synchronously move toward and away from each other together with the transfer bars 10 mounted thereon.

For the up-and-down motion of the transfer bars there is provided a lift cam mechanism 64 coupled to the pair of lift carriers 34 via a rack-and-pinion linkage 66. The lift cam mechanism 64 comprises a disc cam 68 nonrotatably mounted on the camshaft 16, and a lift lever 70 adapted to be oscillated by the disc cam about a fixed pivot at its upper end. The free, lower end of the lift lever is coupled to a rack 72 of the rack-and-pinion linkage 66 via a height adjustment mechanism 74 to be detailed later in connection with FIGS. 2 and 3.

Extending horizontally and parallel to the transfer bars 10, the rack 72 gears with a pinion 76, which in turn gears with another rack 78 extending upwardly and coupled to one of the lift carriers 34 in the adjacency of one of its ends. It will be seen that the rack-and-pinion linkage 66 additionally comprises a rack 80 extending transversely of the transfer bars, three other racks 82 depending from the lift carriers, and pinions 84 in mesh therewith. with. Four air cylinders 86 underlie the lift carriers for biasing same upwardly. Another air cylinder 88 is coupled to the end of the rack 72, away from the lift lever 70, for yieldably exerting a pull on the rack and hence for biasing the lift carriers upwardly. Consequently, with the rotation of the camshaft 16, the pair of lift carriers 34 move up and down together with the grip carriers 32 and transfer bars 10 thereon.

As is seen from the foregoing, the pair of transfer bars 10 are reciprocated longitudinally by the feed mechanism 12, and further moved toward and away from each other by the grip cam mechanism 36 with the rack-and-pinion linkage 38, and up and down by the lift cam mechanism 64 with the rack-and-pinion linkage 66. By the repetition of these motions in a prescribed sequence the transfer bars act to grip, lift, and transport successive panels from one press station to the next.

We will hereinafter describe the height adjustment mechanism 74 shown in detail in FIG. 2. The lift lever 70 has its free end bifurcated and knuckle-jointed to one end of a short link 90 via a pin 92. The other end of this link is also knuckle jointed to a U-shaped member 94 via a pin which is not seen in this figure. Rigidly attached to the U-shaped member is a short, cylindrical member 96 having a flange 98 on its end away from the U-shaped member. An annular inside rim 100 at one end of an abutment housing 102 in the shape of a hollow cylinder is rotatably fitted over the cylindrical member 96. It is thus seen that the abutment housing 102 is pivotally and rotatably coupled to the link 90 and is restrained from axial displacement in either of the opposite directions relative to the link as the rim 100 is positively caught between the U-shaped member and the flange 98 of the cylindrical member 96. The abutment housing 102 slidably extends through a stationary guide sleeve 103 for both relative rotation and axial motion.

Fixedly mounted in the abutment housing 102 is a multiple abutment member 104 generally in the shape of a hollow cylinder. Although shown as separate units for the ease of manufacture, the abutment housing 102 and the multiple abutment member 104 may be considered integral for the purposes of our invention.

Figure 3:
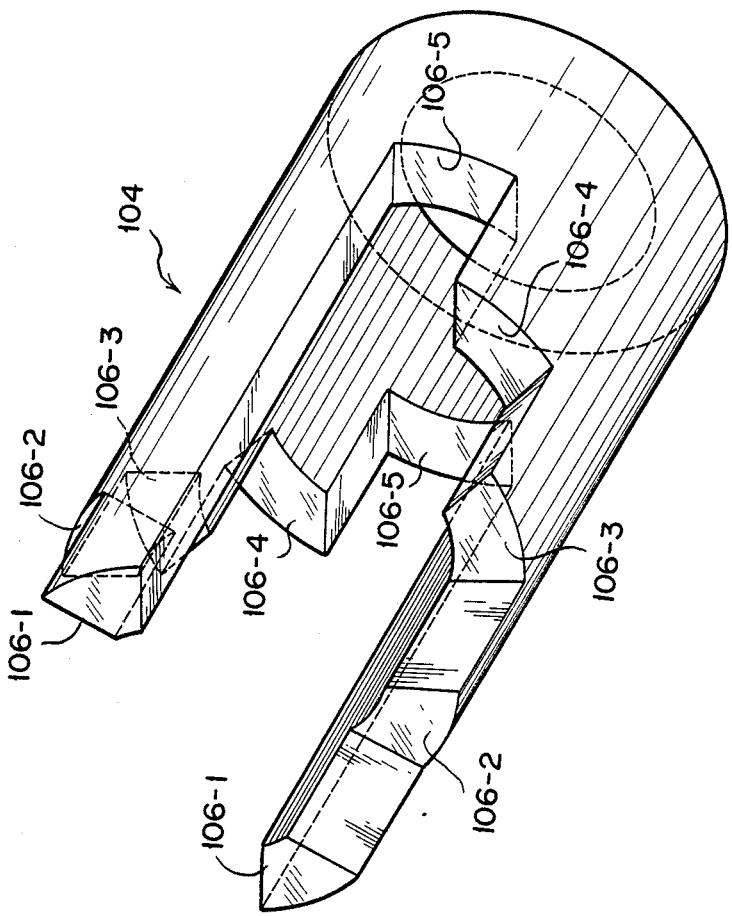
FIG. 3 shows in perspective and on a still more enlarged scale the multiple abutment member in the height adjustment mechanism of FIG. 2.

FIG. 3 is a more detailed, enlarged representation of the multiple abutment member 104. It will be observed from this figure that the multiple abutment member is recessed from one of its opposite ends toward the other to provide a plurality of, five in this particular embodiment, diametrically opposed pairs of abutments 106-1, 106-2, 106-3, 106-4 and 106-5 all directed toward the link 90. All these abutment pairs are of course located in different angular positions about the axis of the multiple abutment member and at different distances from the link 90.

With reference back to FIG. 2 the multiple abutment member 104 is of smaller axial dimension than the abutment housing 102. This difference in size makes it possible to provide a spacing between the recessed end of the multiple abutment member and the opposed surface of the flange 98 on the cylindrical member 96, for a purpose hereinafter made apparent.

Slidably extending through the multiple abutment member 104 for both relative longitudinal and rotary motions is a rodshaped link 108 having one end projecting out of the abutment housing 102 and rigidly coupled to the rack 72 of the rack-and-pinion linkage 66 via a flange union 110. The link 108 has a pair of diametrically opposed hooks 112 on its other end for engagement with any selected one of the abutment pairs 106-1 to 106-5 of the multiple abutment member 104 depending upon the angular position of the latter relative to the link. The angular position of the multiple abutment member is variable by revolving the abutment housing 102, by means we will explain presently. Before revolving the abutment housing, however, the link 108 may be longitudinally displaced toward the closed end of the abutment housing to move the hook pair 112 thereon out of engagement with the multiple abutment member.

We provide toward the above end a linear actuator 114, normally a hydraulic cylinder, having its piston rod 116 coupled to a pair of L-shaped hooks 118 both in abutting engagement with the flange union 110. The hooks 118 are wheeled at 120 for rolling motion along a pair of channel-shaped guides 122, one seen, extending along the link 108 on its opposite sides. Thus the contraction of the actuator 114 results in the movement of the link 108 into the abutment housing 102, until the hook pair 112 thereon becomes received in the spacing between the recessed end of the multiple abutment member 104 and the opposed surface of the flange 98 on the cylindrical member 96. Now the multiple abutment member is ready to be revolved around the link together with the abutment housing. The contraction of the actuator 114 also results in the descent of the transfer bar pair 10 against the forces of the air cylinders 86 and 88, as will be understood by referring back to FIG. 1.

Figure 2:
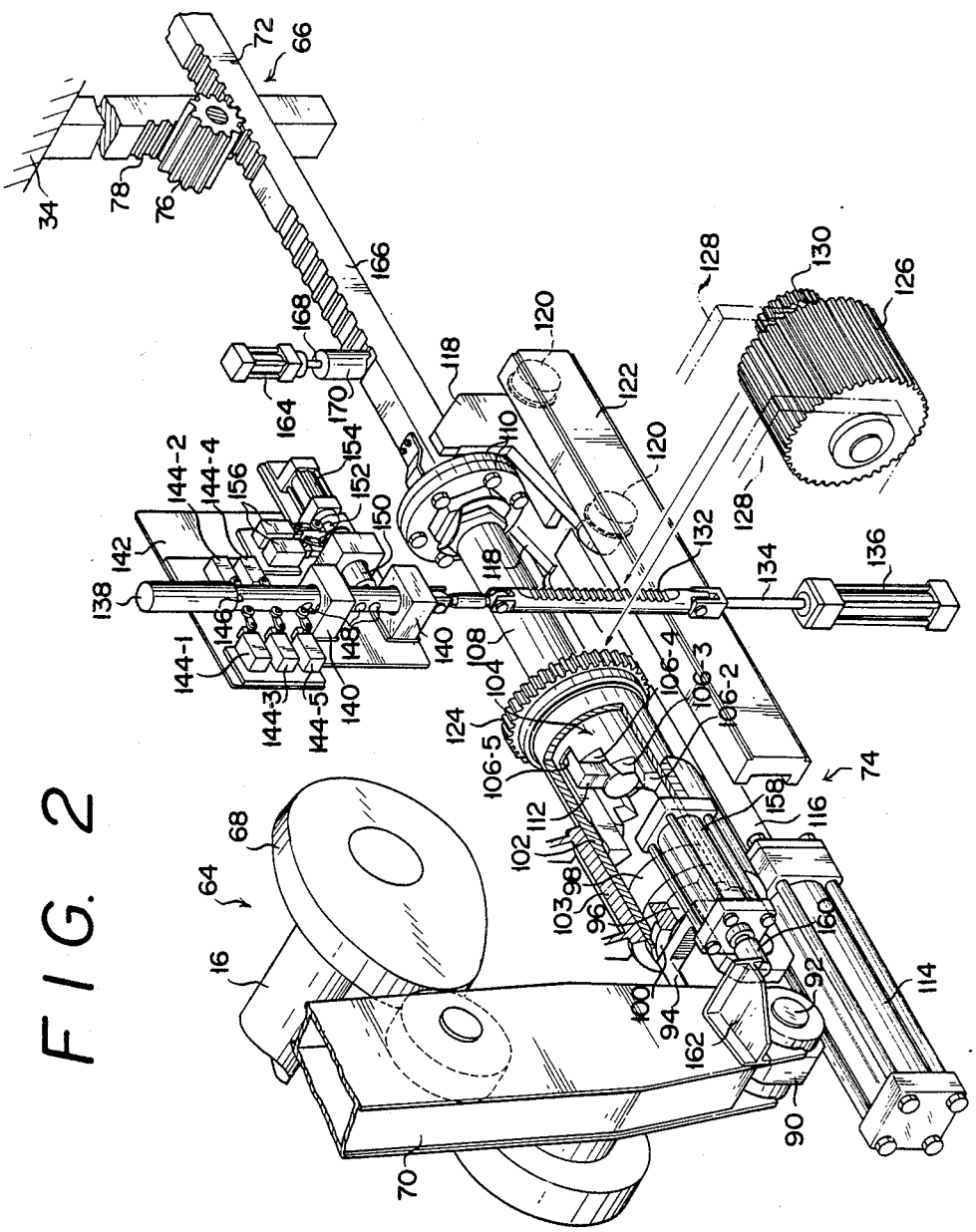
FIG. 2 shows in perspective and on an enlarged scale the height adjustment mechanism for the pair of transfer bars in the apparatus of FIG. 1, with certain parts of the height adjustment mechanism being shown cut away to reveal other parts.

FIG. 2 also illustrates means for revolving the abutment housing 102 for causing the hook pair 112 on the link 108 to engage a different pair of abutments of the multiple abutment member 104. Included in a driven spur gear 124 formed concentrically on the abutment housing 102 for simultaneous rotation therewith. The driven gear 124 meshes with a driving spur gear 126 rotatably supported between a pair of bearing plates 128. The drive gear 126 has a sufficient axial dimension to remain in mesh with the driven gear 124 in spite of the axial reciprocation of the latter during three-dimensional work transfer.

Mounted on the same shaft as the drive gear 126 for joint rotation therewith is a pinion 130 in gear with a rack 132 coupled to the piston rod 134 of a fluid actuated cylinder 136 or like linear actuator. With the extension or contraction of the actuator 136, therefore, the abutment housing 102 with the multiple abutment member 104 therein can be revolved in either direction relative to the link 108.

The rack 132 is further collinearly coupled to a switch actuator rod 138 slidably extending through a pair of guide blocks 140 on a mounting plate 142. Mounted on this plate are five limit switches 144-1, 144-2, 144-3, 144-4 and 144-5 lying on both sides of the switch actuator rod in staggered arrangement. The switch actuator rod has an annular shoulder at 146 for activating the limit switches. The locations of these limit switches correspond to the angular positions of the five pairs of abutments 106-1 to 106-5 of the multiple abutment member 104. When activated, any of the limit switches 144-1 to 144-5 causes the actuator 136 to terminate the travel of the rack 132 in a position where the corresponding one of the abutment pairs 106-1 to 106-5 lies opposite to the hook pair 112 on the link 108.

It is desirable that the rack 132 be locked in any of the five required positions to prevent accidental angular displacement of the multiple abutment member 104. To this end we have formed five bores 148 transversely through the switch actuator rod 138, two of the bores being hidden by one of the guide blocks 140. The spacings between these bores correspond to those between the limit switches 144-1 to 144-5. Arranged for movement into and out of any of the bores 148 is a lockpin 150 coupled to the piston rod 152 of a fluid actuated cylinder or like linear actuator 154. A pair of limit switches 156 are also attached to the mounting plate 142 so as to be activated by the piston rod 152 upon its full extension and full contraction, respectively. These limit switches can be used to sense whether or not the rack 132 is locked against longitudinal displacement.

The illustrated embodiment further includes means for making the lift cam mechanism 64 inoperative in order to allow the apparatus to two-dimensionally transport work. Such means comprise a linear actuator 158 such as a hydraulic cylinder having its piston rod 160 arranged for movement into and out of engagement with an abutment 162 affixed to the lift lever 70 in the vicinity of its free end. Consequently, upon extension of the actuator 158, the lift lever 70 pivots out of engagement with the disc cam 68. Another similar actuator, but of smaller capacity, is provided at 164, just over an additional set of teeth 166 on the rack 72 of the rack-and-pinion linkage 66. The piston rod 168 of the actuator is coupled to a pawl 170 movable into and out of positive engagement with the rack teeth 166.

We believe that the operation of the illustrated work indexing apparatus is largely apparent from the foregoing description, so that we will make some further amplification only with regard to the height adjustment mechanism 74. When the actuator 158 is held contracted as shown in FIG. 2, the lift lever 70 oscillates as aforesaid with the rotation of the camshaft 16. With the lift lever may make direct sliding contact with the disc cam 68 as in FIG. 1, it can also make rolling engagement with the disc cam via a cam follower roll as in FIG. 2.

In either case the lobe of the disc cam 68 causes the lift lever 70 to swing in a clockwise direction as seen in FIG. 2. The clockwise swing of the lift lever results in the leftward displacement of the rack 72, against the bias of the air cylinder 88, via the articulated link 90, abutment housing 102, multiple abutment member 104, hook pair 112, and link 108. Thus the rack-and-pinion linkage 66 causes the descent of the transfer bar pair 10 against the forces of the air cylinders 86 acting on the lift carriers 34.

Riding off the lobe of the disc cam 68, the lift lever 70 pivots in a counterclockwise direction. With the consequent rightward displacement of the multiple abutment member 104 the air cylinder 88 pulls the rack 72 in the same direction thereby allowing the ascent of the transfer bars with the aid of the upward forces of the air cylinders 86. By the repetition of this cycle of operation the transfer bars move up and down between fixed limits.

For changing the limits of the vertical reciprocation of the transfer bars the actuator 114 may be contracted to cause leftward travel of the hook pair 118 in engagement with the flange union 110 against the forces of the air cylinders 86 and 88. Thus displaced leftwardly, the hook pair 112 on the link 108 moves out of engagement with the multiple abutment member 104. Now the actuator 136 may be extended or contracted to revolve the multiple abutment member 104 via the rack 132 and the train of gears 130, 126 and 124, until a desired one of the abutment pairs 106-1 to 106-5 comes opposite to the hook pair 112 on the link 108. Thereupon, activated by the switch actuator rod 138, that one of the limit switches 144-1 to 144-5 which corresponds to the desired abutment pair sets the actuator 136 out of motion. The actuator 154 on the mounting plate 142 is extended subsequently to move the lockpin 150 into one of the bores 148 in the switch actuator rod 138 and hence to lock the multiple abutment member 104 against accidental angular displacement.

Immediately following the revolution of the multiple abutment member 104 to the desired angular position, the actuator 114 may be extended to allow the hook pair 112 on the link 108 to move into engagment with the desired abutment pair by the forces of the air cylinders 86 and 88. Now, as the camshaft 16 is set into rotation, the pair of transfer bars 10 will move up and down between a different sets of limits.

For switching the apparatus from the three-dimensional work transfer mode to that of two-dimensional work transfer, the actuator 158 may be extended to pivot the lift lever 70 in a clockwise direction via the abutment 162. With the lift lever thus moved out of engagement with the disc cam 68, the rotation of the camshaft 16 will result only in the longitudinal and lateral movements of the transfer bars in a fixed horizontal plane. The actuator 158 need not be held extended during such two-dimensional work transfer if, instead, the smaller actuator 164 is held extended to lock the rack 72 against rightward displacement under the biases of the air cylinders 86 and 88 by engaging its teeth 166 with the pawl 170.

While we have shown and described our invention in terms of but one embodiment thereof, we understand, of course, that numerous changes and modifications of the illustrated embodiment may be made to conform to the requirements of specific applications of the inventive concepts, without departing from the scope of our invention as expressed in the following claims.

We claim:

1. Apparatus for indexing work through a succession of processing stations, comprising:
   (A) a pair of transfer bars extending horizontally in parallel spaced relation to each other;
   (B) means for longitudinally reciprocating the transfer bars;
   (C) means for moving the transfer bars toward and away from each other;
   (D) lift carrier means carrying the transfer bars for joint up-and-down motion therewith, the lift carrier means allowing the transfer bars to reciprocate longitudinally and move toward and away from each other;
   (E) a lift cam mechanism comprising a disc cam and a lift lever oscillated thereby; said lift cam mechanism being effective to cause the descent of the transfer bars against the biasing force of a resilient means which bias the transfer bars upward;
   (F) a rack-and-pinion linkage operatively connecting the lift lever of the lift cam mechanism to the lift carrier means for causing the latter, and therefore the transfer bars, to move up and down in response to the oscillation of the lift lever;
   (G) a height adjustment mechanism interposed between the lift lever of the lift cam mechanism and the rack-and-pinion linkage to provide a variable length of connection therebetween and hence to correspondingly vary the upper and lower limits between which the transfer bars are moved up and down, said height adjustment mechanism including,
      (i) a first link pivotally connected at one end to the lift lever of the lift cam mechanism,
      (ii) multiple abutment means pivotally and rotatably connected to another end of the first link and providing a plurality of abutments directed toward the first link, the abutments being located at different distances from the first link and in different angular positions about the axis of rotation of the multiple abutment means,
      (iii) a second link rigidly connected at one end of the rack-and-pinion linkage and at least partly slidably received in the multiple abutment means for both relative longitudinal and rotary motions,
      (iv) hook means on another end of the second link for selective engagement with the abutments of the multiple abutment means depending upon the angular position of the multiple abutment means relative to the second link,
      (v) means for longitudinally displacing the second link toward the first link relative to the multiple abutment means in order to hold the hook means out of engagement with all the abutments during revolution of the multiple abutment means, and
      (vi) drive means for revolving the multiple abutment means relative to the second link to allow selective engagement of the hook means with the abutments, said drive means including,
         (a) a driven gear formed on the multiple abutment means for joint rotation therewith,
         (b) drive gear means in mesh with the driven gear,
         (c) a rack in mesh with the drive gear means, and
         (d) a linear actuator coupled to the rack for linearly moving same;
   (H) a switch actuator rod connected colinearly to the rack of the drive means;
   (I) a plurality of limit switches adapted to be actuated by the switch actuator rod for terminating the linear travel of the rack in any of several predetermined positions where the abutments of the multiple abutment means lie opposite to the hook means on the second link;
   (J) a lockpin movable into and out of any of a plurality of holes formed in the switch actuator rod at longitudinal spacings, the lockpin when received in any of the holes being effective to lock the switch actuator rod, and therefore the rack of the drive means, against longitudinal displacement; and
   (K) a second linear actuator for moving the lockpin into and out of the holes in the switch actuator rod.

2. Apparatus for indexing work through a succession of processing stations, comprising:
   (a) a pair of transfer bars extending horizontally in parallel spaced relation to each other;
   (b) means for longitudinally reciprocating the transfer bars;
   (c) means for moving the transfer bars toward and away from each other;
   (d) lift carrier means carrying the transfer bars for joint up-and-down motion therewith, the lift carrier means allowing the transfer bars to reciprocate longitudinally and move toward and away from each other;

(e) a lift cam mechanism comprising a disc cam and a lift lever oscillated thereby;

(f) a rack-and-pinion linkage operatively connecting the lift lever of the lift cam mechanism to the lift carrier means for causing the latter, and therefore the transfer bars, to move up and down in response to the oscillation of the lift lever;

(g) a height adjustment mechanism interposed between the lift lever of the lift cam mechanism and the rack-and-pinion linkage to provide a variable length of connection therebetween and hence to correspondingly vary the upper and lower limits between which the transfer bars are moved up and down; and (h) means for moving and holding the lift lever of the lift cam mechanism out of engagement with the disc cam in order to allow the transfer bars to two-dimensionally transfer work.

3. The work indexing apparatus as recited in claim 2, wherein the moving and holding means comprises:

(a) an abutment formed on the lift lever;

(b) a first linear actuator acting on the abutment for moving the lift lever out of engagement with the disc cam; and (c) a second linear actuator acting on the rack-and-pinion linkage for holding the lift lever out of engagement with the disc cam.

* * * * *

UNITED STATES PATENT AND TRADEMARK OFFICE
CERTIFICATE OF CORRECTION

PATENT NO. : 4,819,786
DATED : April 11, 1989
INVENTOR(S) : Toshihiro TANAKA et al It is certified that error appears in the above-identified patent and that said Letters Patent is hereby corrected as shown below:

On the cover page, before Item [51], insert

--[30]    Foreign Application Priority Data

Oct. 9, 1981 [JP]    Japan....................56-149353
   Oct. 9, 1981 [JP]    Japan....................56-160329--.

Signed and Sealed this

Twenty-sixth Day of September, 1989

Attest:

DONALD J. QUIGG

Attesting Officer    Commissioner of Patents and Trademarks